United States Patent
Hanus et al.

(10) Patent No.: US 12,319,403 B2
(45) Date of Patent: Jun. 3, 2025

(54) INTEGRATED POSITION SENSOR WITH DUAL SYNCHRONIZED OUTPUTS

(71) Applicant: HONEYWELL INTERNATIONAL INC., Charlotte, NC (US)

(72) Inventors: Petr Hanus, Brno (CZ); Ondrej Hajek, Brno (CZ); Ondrej Mandel, Prague (CZ); Darrell W. Horner, Tempe, AZ (US)

(73) Assignee: HONEYWELL INTERNATIONAL, INC., Charlotte, NC (US)

( * ) Notice: Subject to any disclaimer, the term of this patent is extended or adjusted under 35 U.S.C. 154(b) by 4 days.

(21) Appl. No.: 18/453,088

(22) Filed: Aug. 21, 2023

(65) Prior Publication Data
US 2024/0262492 A1 Aug. 8, 2024

Related U.S. Application Data

(60) Provisional application No. 63/483,646, filed on Feb. 7, 2023.

(51) Int. Cl.
*B64C 13/50* (2006.01)
(52) U.S. Cl.
CPC .................. *B64C 13/503* (2013.01)
(58) Field of Classification Search
CPC .............. B64C 13/50; B64C 13/503
See application file for complete search history.

(56) References Cited

U.S. PATENT DOCUMENTS

| 11,697,495 B1* | 7/2023 | Henck ................ B64C 29/0016 244/7 R |
| 2022/0009616 A1* | 1/2022 | Galvão et al. ........ B64C 13/503 |
| 2023/0152822 A1* | 5/2023 | Wiegman ............... B64C 13/04 701/4 |

OTHER PUBLICATIONS

XP055675084_John William Bennett "Fault Tolerant Electromechanical Actuators for Aircraft", Nov. 1, 2010 Retrieved from the Internet: URL:https://pdfs.semanticscholar.org/21dd/65c1dba80fb14b211d9f2b290e7475f5d1d1.pdf?_ga=2.240473540.637559629.1583832198-484601563.1552319601. Chapter 4; pp. 68-107; Figures 4-12, 4-13, 4-22, 4-23, 4-24, 4-27, 4-28.

\* cited by examiner

*Primary Examiner* — Richard G Davis
(74) *Attorney, Agent, or Firm* — Lorenz & Kopf LLP (57) ABSTRACT

A system configuration significantly reduces the number of interconnections needed between an electromechanical actuator (EMA) and an EMA controller (EMAC) while maintaining redundancy and other safety aspects needed by the target application. This allows simplification of communication interfaces between multiple sensors in the EMA and EMAC and unification of the interface to multiple sensors inside the EMAC, leading to cost and weight reduction that can be significant for many aerospace products and applications, including unmanned vehicle (e.g., UAM/UAV) applications.

19 Claims, 3 Drawing Sheets

INTEGRATED POSITION SENSOR WITH DUAL SYNCHRONIZED OUTPUTS

CROSS REFERENCE TO RELATED APPLICATION

The present application claims benefit of prior filed Provisional Patent Application No. 63/483,646, filed Feb. 7, 2023, which is hereby incorporated by reference herein in its entirety.

TECHNICAL FIELD

The present disclosure relates to position sensors and position sensing systems, and more particularly relates to an integrated position sensor with dual synchronized outputs.

BACKGROUND

Modern aircraft are evolving to a more-electric architecture for actuation requirements, including for flight control surface control, engine tilt control, and propeller pitch control—as well as a number of other utility applications. More electric control relies on the use of electro-mechanical actuators (EMAs) with electro-mechanical motors. Electro-mechanical actuators in turn rely on electro-mechanical actuator controllers (EMACs). Some aircraft actuation requirements are categorized as flight critical and thus require high integrity EMA control to prevent loss of control or erroneous control. Because of the flight criticality, EMACs, which contain electronic circuitry and software, must also be of high integrity.

Most EMAs contain output position sensors that the EMACs utilize as feedback for their control. For example, many EMAs include a motor commutation sensor and an actuator rod position sensor. Both sensors provide position feedback to the EMAC control logic. Generally, each unique EMA sensor is interfaced via its own interface. In the case of redundant sensors, each part of the redundant sensor is interfaced via a separate interface to achieve robustness and redundancy. This configuration increases number of interconnecting wires between the EMA and EMAC, adding weight to both EMA and EMAC (connector size and number of wires needed for internal wiring inside both EMA and EMAC) and adding weight to the interconnection cable bundle between the EMA and EMAC (high number of interconnecting wires).

Hence, there is a need for a sensor configuration that does not exhibit the drawbacks described above. The instant disclosure addresses this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

This disclosure significantly reduces the number of interconnections needed between an EMA and an EMAC while maintaining redundancy and other safety aspects needed by the target application. This allows simplification of communication interfaces between multiple sensors in the EMA and EMAC and unification of the interface to multiple sensors inside the EMAC, leading to cost and weight reduction that can be significant for many aerospace products and applications, including unmanned vehicle (e.g., UAM/UAV) applications.

In one embodiment, an actuator control system includes an actuator controller and an actuator. The actuator controller is coupled to receive position command data that is indicative of a commanded position of a component and is configured, upon receipt of the position command data, to generate and supply actuator commands. The actuator in is operable communication with, and is coupled to receive the actuator commands from, the actuator controller. The actuator is configured, upon receipt of the actuator commands, to move the component to the commanded position and to supply feedback data to the actuator controller. The actuator includes an actuator motor, an actuator output interface, a plurality of motor position sensors, a plurality of actuator output position sensors, a plurality of actuator processors, and a plurality of actuator communication buses. The motor is moveable to a rotational motor position. The actuator output interface is coupled to the motor and is adapted to be coupled to the component. The actuator output interface is moveable to an actuator output position. Each motor position sensor is configured to supply motor position data representative of the rotational motor position. Each actuator output position sensor is configured to supply actuator position data representative of the actuator output position. Each actuator processor (i) is in operable communication with, and coupled to receive the motor position data from, a different one of the motor position sensors and (ii) is in operable communication with, and coupled to receive the actuator position data from, a different one of the actuator output position sensors. Each actuator processor is configured to at least process and combine the motor position data and the actuator position data it receives into a single sensor data packet. Each actuator communication bus is in operable communication with a different one of the sensor processors and with the actuator controller. Each actuator communication bus is configured to at least supply the single sensor data packet it receives to the actuator controller.

In another embodiment, an actuator includes an actuator motor, an actuator output interface, a plurality of motor position sensors, a plurality of actuator output position sensors, a plurality of actuator processors, and a plurality of actuator communication buses. The motor is moveable to a rotational motor position. The actuator output interface is coupled to the motor and is adapted to be coupled to the component. The actuator output interface is moveable to an actuator output position. Each motor position sensor is configured to supply motor position data representative of the rotational motor position. Each actuator output position sensor is configured to supply actuator position data representative of the actuator output position. Each actuator processor is (i) in operable communication with, and coupled to receive the motor position data from, a different one of the motor position sensors and (ii) is in operable communication with, and coupled to receive the actuator position data from, a different one of the actuator output position sensors. Each actuator processor is configured to at least process and combine the motor position data and the actuator position data it receives into a single sensor data packet. Each actuator communication bus is in operable communication with a different one of the actuator processors and is configured to at least transmit the single sensor data packet it receives.

In yet another embodiment, an aircraft fly-by-wire flight control system includes a flight control inceptor, a flight control computer, a flight control surface actuator controller, and a flight control surface actuator. The flight control inceptor is configured to receive user input from a user and is configured, in response to the user input, to supply inceptor command data. The flight control computer is in operable communication with the flight control inceptor. The flight control computer is coupled to receive the inceptor command data from the flight control inceptor and is configured, upon receipt of the inceptor data, to generate and supply flight control surface position command data. The flight control surface actuator controller is in operable communication with the flight control computer. The flight control surface actuator controller is coupled to receive the flight control surface position command data and is configured, upon receipt of the flight control surface position command data, to generate and supply flight control surface actuator commands. The flight control surface actuator is in operable communication with, and is coupled to receive the flight control surface actuator commands from, the flight control surface actuator controller. The flight control surface actuator is configured, upon receipt of the flight control surface actuator commands, to move a flight control surface to the commanded position and to supply feedback data to the actuator controller, the flight control surface actuator includes an actuator motor, an actuator output interface, a plurality of motor position sensors, a plurality of actuator output position sensors, a plurality of actuator processors, and a plurality of actuator communication buses. The actuator motor is moveable to a rotational motor position. The actuator output interface is adapted to be coupled to the flight control surface and is moveable to an actuator output position. Each motor position sensor is configured to supply motor position data representative of the rotational motor position. Each actuator output position sensor is configured to supply actuator position data representative of the actuator output position. Each actuator processor is (i) in operable communication with, and coupled to receive the motor position data from, a different one of the motor position sensors and (ii) is in operable communication with, and coupled to receive the actuator position data from, a different one of the actuator output position sensors. Each actuator processor is configured to at least process and combine the motor position data and the actuator position data it receives into a single sensor data packet. Each actuator communication bus is in operable communication with a different one of the sensor processors and with the actuator controller. Each actuator communication bus is configured to at least supply the single sensor data packet it receives to the actuator controller.

Furthermore, other desirable features and characteristics of the integrated position sensor with dual synchronized outputs will become apparent from the subsequent detailed description and the appended claims, taken in conjunction with the accompanying drawings and the preceding background.

BRIEF DESCRIPTION OF DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
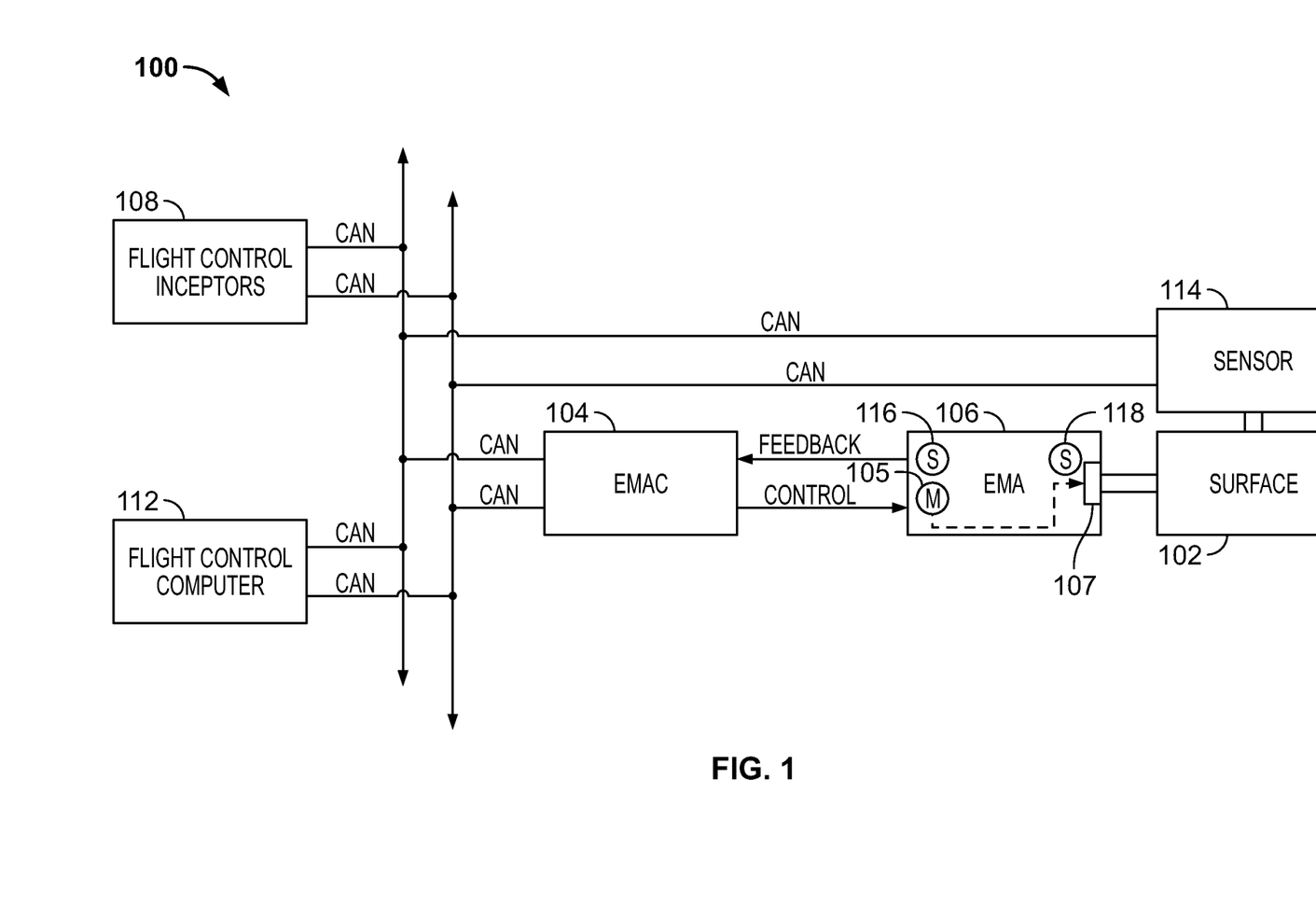
FIG. 1 depicts a functional block diagram of one embodiment of an aircraft fly-by-wire flight control system.

Referring to FIG. 1, a functional block diagram of one embodiment of an aircraft fly-by-wire flight control system 100 is depicted. For simplicity, ease of illustration, and ease of description, the depicted system 100 is configured to control the position of a single flight control surface 102. It will be appreciated, however, that in other embodiments, such as the one described further below, the system 100 may be configured to control multiple flight control surfaces.

The depicted system 100 includes at least one flight control surface actuator controller 104, at least one flight control surface actuator 106, one or more flight control inceptors 108, at least one flight control computer 112, and at least one digital surface position sensor 114. The flight control surface actuator controller 104 is coupled to receive, from at least one flight control computer 112, flight control surface position command data that is indicative of a commanded position of the flight control surface 102. The flight control surface actuator controller 104 is configured, upon receipt of the flight control surface position command data, to generate and supply flight control surface actuator commands to the flight control surface actuator 106.

The flight control surface actuator(s) 106 is coupled to receive the flight control surface actuator commands from the flight control surface actuator controller 104 and is configured, upon receipt thereof, to move the flight control surface 102 to the commanded position. It will be appreciated that the flight control surface actuator(s) 106 may be implemented using any one of numerous known actuators, but in the depicted embodiment it is implemented using an electromechanical actuator (EMA), which includes, for example, an actuator motor 105 that is moveable to a rotational position, and an actuator output interface 107 that is coupled to the motor 105 and is adapted to be coupled to a component, such as the flight control surface 102, and is moveable to an actuator output position. One specific example of a suitable electromechanical actuator is, for example, a motor-driven ball screw actuator. As FIG. 1 also depicts, and as will be described in more detail below, the flight control surface actuator(s) 106 supplies feedback (e.g., position feedback) to the flight control surface actuator controller 104.

The flight control inceptor(s) 108 is in operable communication with the flight control surface actuator controller(s) and the flight control computer(s) 112. The flight control inceptor(s) 108 is configured to receive user input from a user (e.g., a pilot) and is configured, in response to the user input, to supply the inceptor command data to the flight control computer(s) 108. The flight control inceptor(s) 108 may be implemented as a yoke, a side stick, a collective, and/or a rudder pedal, just to name a few non-limiting examples.

The flight control computer(s) 112 is in operable communication with the flight control inceptor(s) 108 and the flight control surface actuator controller(s) 104. The flight control computer(s) 112 is coupled to receive the inceptor command data from the flight control inceptor(s) 112 and is configured, upon receipt of the inceptor data, to generate and supply the flight control surface position command data to the flight control surface actuator controller 104.

The surface position sensor(s) 114 is in operable communication with at least the flight control computer(s) 112. The surface position sensor(s) 114 is coupled to, and is configured to sense the position of, the aircraft flight control surface 102 and supply a position signal representative thereof to the flight control computer(s) 112.

Figure 2:
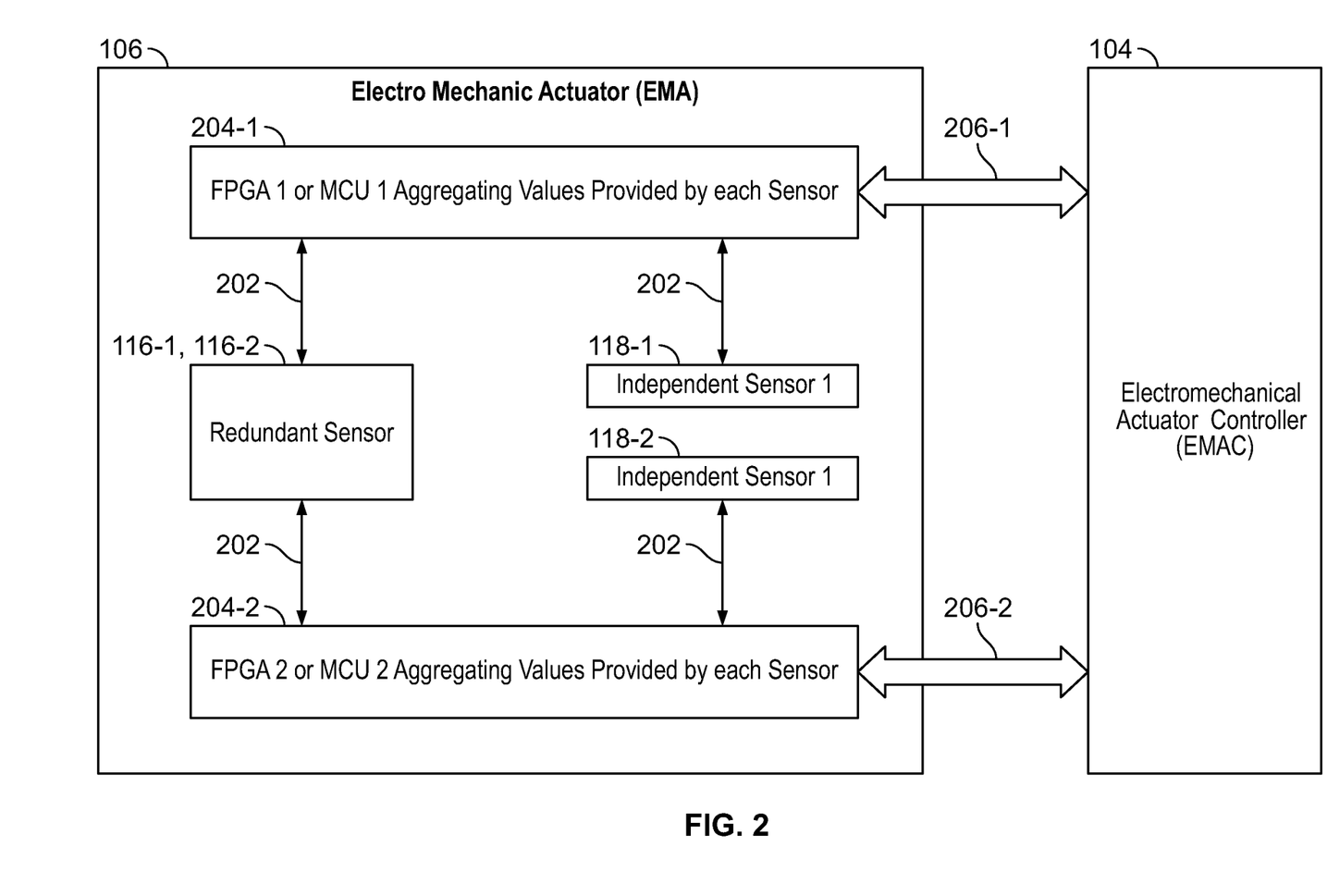
FIG. 2 depicts a functional block diagram of one embodiment of an integrated position sensor with dual synchronized outputs that may be implemented in the flight control surface actuator of FIG. 1.

As noted above, the flight control surface actuator(s) 106 supplies feedback (e.g., position feedback) to the flight control surface actuator controller 104. In the depicted embodiment, the position feedback is supplied from one or more motor/motor shaft position sensors 116 and one or more actuator output/output rod position sensors 118. As depicted in FIG. 2, each of these one or more sensors 116, 118 supplies position data via a different one of a plurality of sensor communication interfaces 202. The sensor communication interfaces 202 can be similar or dissimilar between all position sensors 116, 118. That is, all of the sensors 116, 118 may use one type of sensor communication interface 202 (similar), or each position sensor 116, 118 may use different types of sensor communication interfaces 202 (dissimilar).

The position data supplied from each half of a redundant sensor (in case of multi-die sensor) or by one of the independent redundant sensors inside the EMA 106 is received by a dedicated actuator processor 204 (204-1, 204-2), such as a field programmable gate array (FPGA) or a microcontroller unit (MCU). The actuator processor 204 processes the position data supplied from its associated position sensors 116, 118 and combines it into a data packet that is sent to the flight control surface actuator controller 104. The flight control surface actuator 106 depicted in FIG. 2 includes two independent actuator processors 204, each communicating, via independent actuator communication buses 206 (206-1, 206-2), with an independent actuator control processor 301 (301-1, 301-2) (see FIG. 3) in the flight control surface actuator controller 104. This allows for redundancy while simultaneously reducing the number of communication buses. It will be appreciated that the actuator communication buses 206 may also be similar or dissimilar.

Figure 3:
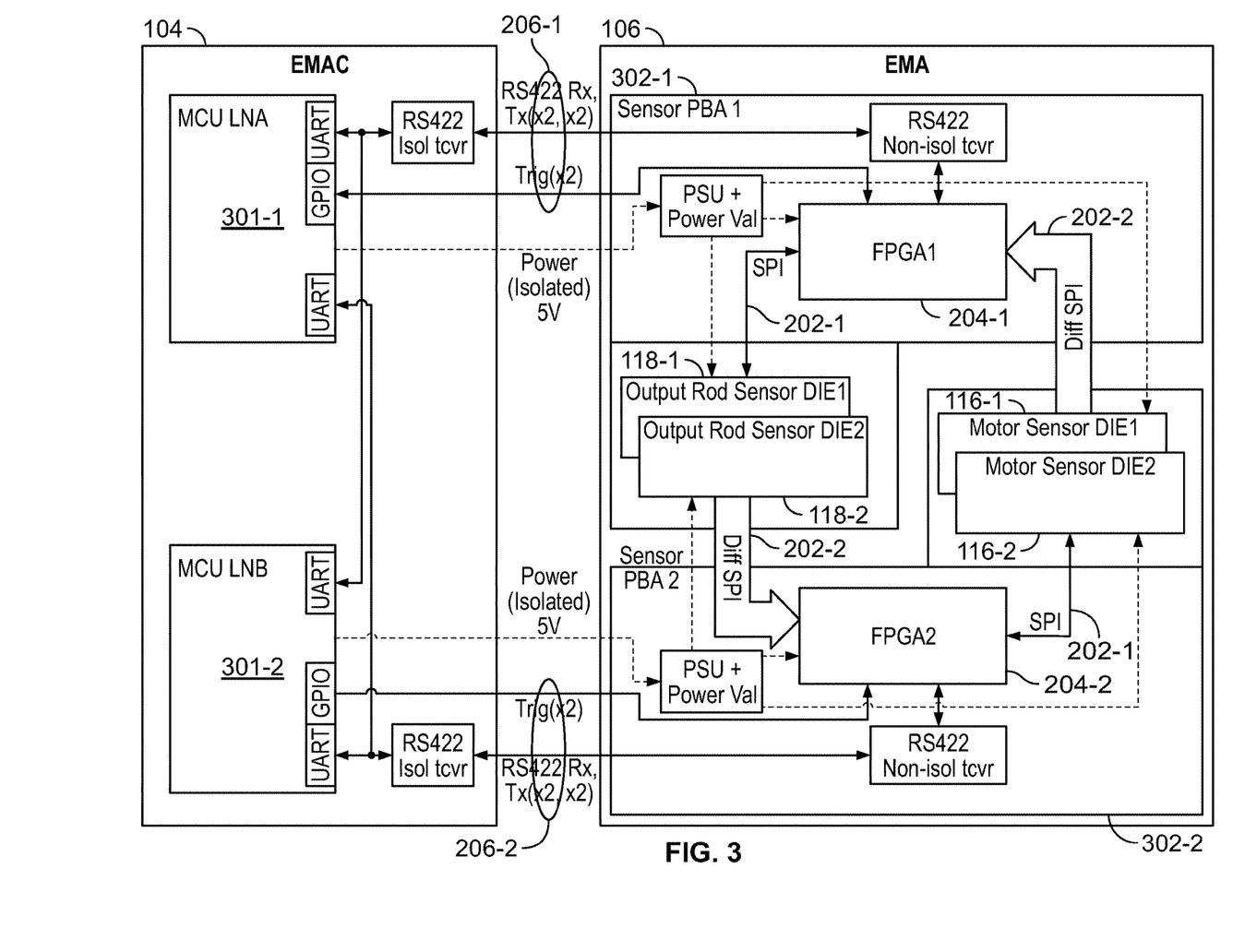
FIG. 3 depicts a functional block diagram of another embodiment of an integrated position sensor with dual synchronized outputs that may be implemented in the flight control surface actuator of FIG. 1.

In some embodiments, as depicted in FIG. 3, two identical printed circuit board assemblies (PBAs) 302 may be used—a first PBA 302-1 and a second PBA 302-2. In such embodiments, the first PBA 302-1 includes two of the same type of position sensor 116 or 118, and a first actuator processor 204-1, and the second PBA 304-1 includes two of the same type of position sensor 116 or 118, and a second actuator processor 204-2. In the depicted embodiment, the first PBA 302-1 includes a first actuator output/output rod position sensors 118-1 and a second actuator output/output rod position sensors 118-2, and the second PBA 302-2 includes a first motor/motor shaft position sensor 116-1 and a second motor/motor shaft position sensor 116-2. It will be appreciated that in other embodiments the flight control surface actuators 106 may be implemented with only one PBA 302, in which the actuator processors 204-1 and 204-2 and sensors 116, 118 are located on the same PBA 302, or the flight control surface actuators 106 may include more than two PBAs (e.g., 302-1, 302-2, . . . 302-N).

As FIG. 3 also depicts, each PBA 302 includes two different types of interfaces 202—a first sensor communication interface 202-1 and a second sensor communication interface 202-2. In the depicted embodiment, the first sensor communication interface 202-1 is used for intra-PBA communications between the sensors 116, 118 and the processors 204, and the second sensor communication interface 202-2 is used for inter-PBA communications between the sensors 116, 118 and the processors 204. Thus, as depicted, the first actuator output/output rod position sensor 118-1 communicates with the first actuator processor 204-1, which are both on the first PBA 302-1, via the first sensor communication interface 202-1. However, the second actuator output/output rod position sensor 118-2, which is on the first PBA 302-1, communicates with the second actuator processor 204-2, which is on the second PBA 302-2, via the second sensor communication interface 202-2. Similarly, the first motor/motor shaft position sensor 116-1, which is on the second PBA 204-2, communicates with the first actuator processor 204-1, which is on the first PBA 302-1-1, via the second sensor communication interface 202-2, whereas the second motor/motor shaft position sensor 116-2 communicates with the second actuator processor 204-2, which are both on the second PBA 302-2, via the first sensor communication interface 202-1.

Another feature that may be implemented is that the actuator communication buses 206 can be implemented using any one of numerous types of communication buses. For example, the actuator communication buses 206 may be implemented using half duplex bidirectional buses, full duplex bidirectional buses, unidirectional buses with external trigger signals, or unidirectional buses without external trigger signals, just to name a few. The actuator communication buses 206 may also use any one of numerous robust communication protocols, such as RS485, RS422, or BiSS, or any other suitable communication protocol, rather than using a sensor local bus that could potentially not be suitable for transmitting data over a long distance. As is known, in some instances the distance between a flight control surface actuator(s) 106 and its associated flight control surface actuator controller 104 can vary from several inches to several feet. It is noted that, in those embodiments that rely on trigger signals, the trigger signals compensate for any delay that may be caused by translation of data from the sensor communication interfaces 202 to the actuator communication buses 206 (e.g., RS485 or similar communication bus). The actuator processors 204 need to first receive complete data packages from the associated sensors 116, 118, via the sensor communication interfaces 202. The actuator processors 204 then need to translate the sensor data to actuator communication buses 206 (e.g., RS485 or similar communication bus) and transmit the data to the flight control surface actuator controller 104. This takes some time, but the delay caused by the conversion can be relatively easily calculated. The flight control surface actuator controller 104 usually knows when it would need fresh position data for control algorithm execution, so it can trigger reading the sensors 116, 118 in advance to have the data more precisely on time.

The system described herein saves weight in, for example, Urban Air Mobility and Unmanned Aerial vehicles (UAM/UAV) where low weight is key enabler of the technology. The discloses system is not limited to UAM/UAV environments, but can find application in other aerospace environments where redundant data transmission is needed from multiple sensors.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may for instance, comprise one or more physical or logical modules of computer instructions that may for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth herein.

What is claimed is:

1. An actuator control system, comprising:
   an actuator controller coupled to receive position command data that is indicative of a commanded position of a component, the actuator controller configured, upon receipt of the position command data, to generate and supply actuator commands; and
   an actuator in operable communication with, and coupled to receive the actuator commands from, the actuator controller, the actuator configured, upon receipt of the actuator commands, to move the component to the commanded position and to supply feedback data to the actuator controller, the actuator including:
   an actuator motor moveable to a rotational motor position,
   an actuator output interface coupled to the motor and adapted to be coupled to the component, the actuator output interface moveable to an actuator output position,
   a plurality of motor position sensors, each motor position sensor configured to supply motor position data representative of the rotational motor position,
   a plurality of actuator output position sensors, each actuator output position sensor configured to supply actuator position data representative of the actuator output position,
   a plurality of actuator processors, each actuator processor (i) in operable communication with, and coupled to receive the motor position data from, a different one of the motor position sensors and (ii) in operable communication with, and coupled to receive the actuator position data from, a different one of the actuator output position sensors, each actuator processor configured to at least process and combine the motor position data and the actuator position data it receives into a single sensor data packet, and
   a plurality of actuator communication buses, each actuator communication bus in operable communication with a different one of the sensor processors and with the actuator controller, each actuator communication bus configured to at least supply the single sensor data packet it receives to the actuator controller.

2. The system of claim 1, wherein the actuator controller comprises:
   a plurality of actuator control processors, each actuator control processor in operable communication with a different one of the actuator communication buses and configured to supply the actuator position commands to one of the actuator processors via its actuator communication bus.

3. The system of claim 1, wherein the actuator communication buses are implemented using dissimilar communication protocols.

4. The system of claim 1, wherein:
   the plurality of motor position sensors includes a first motor position sensor and a second motor position sensor;
   the plurality of actuator position sensors includes a first actuator position sensor and a second actuator position sensor; and
   the plurality of actuator processors includes a first actuator processor and a second actuator processor.

5. The system of claim 4, wherein the actuator further includes:
   a first printed circuit board having mounted thereon the first actuator processor, the first actuator position sensor, and the second actuator position sensor; and
   a second printed circuit board having mounted thereon the second actuator processor, the first motor position sensor, and the second motor position sensor.

6. The system of claim 4, wherein:
   the first actuator position sensor is in operable communication with the first actuator processor;
   the second actuator position sensor is in operable communication with the second actuator processor;
   the first motor position sensor is in operable communication with the first actuator processor; and
   the second motor position sensor is in operable communication with the second actuator processor.

7. The system of claim 6, wherein:
   the first actuator position sensor is in operable communication with the first actuator processor via a first type of sensor communication interface;
   the second actuator position sensor is in operable communication with the second actuator processor via a second type of sensor communication interface;
   the first motor position sensor is in operable communication with the first actuator processor via the second type of sensor communication interface; and
   the second motor position sensor is in operable communication with the second actuator processor via the first type of sensor communication interface.

8. An actuator, comprising:
an actuator motor moveable to a rotational motor position,
an actuator output interface adapted to be coupled to the component and moveable to an actuator output position,
a plurality of motor position sensors, each motor position sensor configured to supply motor position data representative of the rotational motor position,
a plurality of actuator output position sensors, each actuator output position sensor configured to supply actuator position data representative of the actuator output position,
a plurality of actuator processors, each actuator processor (i) in operable communication with, and coupled to receive the motor position data from, a different one of the motor position sensors and (ii) in operable communication with, and coupled to receive the actuator position data from, a different one of the actuator output position sensors, each actuator processor configured to at least process and combine the motor position data and the actuator position data it receives into a single sensor data packet, and
a plurality of actuator communication buses, each actuator communication bus in operable communication with a different one of the actuator processors and configured to at least transmit the single sensor data packet it receives.

9. The actuator of claim 8, wherein:
the plurality of motor position sensors includes a first motor position sensor and a second motor position sensor;
the plurality of actuator position sensors includes a first actuator position sensor and a second actuator position sensor; and
the plurality of actuator processors includes a first actuator processor and a second actuator processor.

10. The actuator of claim 8, further comprising:
a first printed circuit board having mounted thereon the first actuator processor, the first actuator position sensor, and the second actuator position sensor; and
a second printed circuit board having mounted thereon the second actuator processor, the first motor position sensor, and the second motor position sensor.

11. The system of claim 10, wherein:
the first actuator position sensor is in operable communication with the first actuator processor;
the second actuator position sensor is in operable communication with the second actuator processor;
the first motor position sensor is in operable communication with the first actuator processor; and
the second motor position sensor is in operable communication with the second actuator processor.

12. The system of claim 11, wherein:
the first actuator position sensor is in operable communication with the first actuator processor via a first type of sensor communication interface;
the second actuator position sensor is in operable communication with the second actuator processor via a second type of sensor communication interface;
the first motor position sensor is in operable communication with the first actuator processor via the second type of sensor communication interface; and
the second motor position sensor is in operable communication with the second actuator processor via the first type of sensor communication interface.

13. An aircraft fly-by-wire flight control system, comprising:
a flight control inceptor configured to receive user input from a user and configured, in response to the user input, to supply inceptor command data;
a flight control computer in operable communication with the flight control inceptor, the flight control computer coupled to receive the inceptor command data from the flight control inceptor and configured, upon receipt of the inceptor data, to generate and supply flight control surface position command data;
a flight control surface actuator controller in operable communication with the flight control computer, the flight control surface actuator controller coupled to receive the flight control surface position command data and configured, upon receipt of the flight control surface position command data, to generate and supply flight control surface actuator commands; and
a flight control surface actuator in operable communication with, and coupled to receive the flight control surface actuator commands from, the flight control surface actuator controller, the flight control surface actuator configured, upon receipt of the flight control surface actuator commands, to move a flight control surface to the commanded position and to supply feedback data to the actuator controller, the flight control surface actuator including:
an actuator motor moveable to a rotational motor position,
an actuator output interface adapted to be coupled to the flight control surface and moveable to an actuator output position,
a plurality of motor position sensors, each motor position sensor configured to supply motor position data representative of the rotational motor position,
a plurality of actuator output position sensors, each actuator output position sensor configured to supply actuator position data representative of the actuator output position,
a plurality of actuator processors, each actuator processor (i) in operable communication with, and coupled to receive the motor position data from, a different one of the motor position sensors and (ii) in operable communication with, and coupled to receive the actuator position data from, a different one of the actuator output position sensors, each actuator processor configured to at least process and combine the motor position data and the actuator position data it receives into a single sensor data packet, and
a plurality of actuator communication buses, each actuator communication bus in operable communication with a different one of the sensor processors and with the actuator controller, each actuator communication bus configured to at least supply the single sensor data packet it receives to the actuator controller.

14. The system of claim 13, wherein the actuator controller comprises:
a plurality of actuator control processors, each actuator control processor in operable communication with a different one of the actuator communication buses and configured to supply the actuator position commands to one of the actuator processors via its communication bus.

15. The system of claim 13, wherein the actuator communication buses are implemented using dissimilar communication protocols.

16. The system of claim 13, wherein:
the plurality of motor position sensors includes a first motor position sensor and a second motor position sensor;
the plurality of actuator position sensors includes a first actuator position sensor and a second actuator position sensor; and
the plurality of actuator processors includes a first actuator processor and a second actuator processor.

17. The system of claim 16, wherein the flight control surface actuator further includes:
a first printed circuit board having mounted thereon the first actuator processor, the first actuator position sensor, and the second actuator position sensor; and
a second printed circuit board having mounted thereon the second actuator processor, the first motor position sensor, and the second motor position sensor.

18. The system of claim 16, wherein:
the first actuator position sensor is in operable communication with the first actuator processor;
the second actuator position sensor is in operable communication with the second actuator processor;
the first motor position sensor is in operable communication with the first actuator processor; and
the second motor position sensor is in operable communication with the second actuator processor.

19. The system of claim 18, wherein:
the first actuator position sensor is in operable communication with the first actuator processor via a first type of sensor communication interface;
the second actuator position sensor is in operable communication with the second actuator processor via a second type of sensor communication interface;
the first motor position sensor is in operable communication with the first actuator processor via the second type of sensor communication interface; and
the second motor position sensor is in operable communication with the second actuator processor via the first type of sensor communication interface.

* * * * *